US006974214B2

(12) United States Patent
Welk et al.

(10) Patent No.: US 6,974,214 B2
(45) Date of Patent: Dec. 13, 2005

(54) B-SPLINE OPTIMIZATION OF OPTICAL GLASSES ESPECIALLY SPECTACLE GLASSES WITH PLANES OF SYMMETRY

(75) Inventors: Andrea Welk, Munich (DE); Helmut Altheimer, Lauchdorf (DE); Peter Baumbach, Munich (DE); Rainer Dorsch, Munich (DE); Gregor Esser, Munich (DE); Walter Haimerl, Munich (DE); Herbert Pfeiffer, Munich (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 10/467,717

(22) PCT Filed: Feb. 12, 2002

(86) PCT No.: PCT/DE02/00496

§ 371 (c)(1),
(2), (4) Date: Jan. 13, 2004

(87) PCT Pub. No.: WO02/065195

PCT Pub. Date: Aug. 22, 2002

(65) Prior Publication Data

US 2004/0114100 A1 Jun. 17, 2004

(30) Foreign Application Priority Data

Feb. 12, 2001 (DE) .......................................... 101 06 386

(51) Int. Cl.$^7$ .............................................. G02C 7/02
(52) U.S. Cl. ....................................... 351/177; 351/159
(58) Field of Search ................................. 351/177, 176, 351/159, 41, 160 R, 160 H, 161, 168–169

(56) References Cited

U.S. PATENT DOCUMENTS

| 5,444,503 | A | | 8/1995 | Kelch et al. ................. 351/169 |
| 5,880,810 | A | * | 3/1999 | Altheimer et al. .......... 351/169 |
| 6,752,497 | B2 | * | 6/2004 | Esser et al. ................. 351/159 |
| 6,789,896 | B2 | * | 9/2004 | Morris et al. ............... 351/159 |

FOREIGN PATENT DOCUMENTS

| DE | 19511613 | 5/1996 |
| EP | 0886166 | 12/1998 |
| WO | 02/065195 | 8/2002 |

OTHER PUBLICATIONS

C. Fuerter, "Optik–Konstruktion mit Splines" Optik, vol. 70, No. 1, 1985, pp. 19–28.

* cited by examiner

Primary Examiner—Jordan M. Schwartz
(74) Attorney, Agent, or Firm—Crowell & Moring LLP

(57) ABSTRACT

A method for optimizing an atoroidal surface of an optical lens, in particular a spectacle lens, having at least one plane of symmetry is characterized by a combination of the following features: dividing the atoroidal surface having at least one plane of symmetry into at least two regions separated by the at least one plane of symmetry; representing one of the separate regions (represented region) of this surface by a set of coefficients of B spline functions; computing sagittal heights of the represented region by B spline interpolation; computing sagittal heights in at least one other region by mirroring coefficients or coordinates at the at least one plane of symmetry; and optimizing the atoroidal surface only by varying the set of B spline coefficients of the represented region.

20 Claims, 1 Drawing Sheet

```
0.500  0.437  0.386  0.345  0.315  0.295  0.285  0.285  0.295  0.315  0.345  0.386  0.437  0.500
0.409  0.348  0.298  0.258  0.229  0.209  0.200  0.200  0.209  0.229  0.258  0.298  0.348  0.409
0.336  0.276  0.227  0.188  0.159  0.140  0.131  0.131  0.140  0.159  0.188  0.227  0.276  0.336
0.279  0.220  0.172  0.134  0.105  0.087  0.077  0.077  0.087  0.105  0.134  0.172  0.220  0.279
0.237  0.179  0.131  0.094  0.066  0.047  0.038  0.038  0.047  0.066  0.094  0.131  0.179  0.237
0.209  0.152  0.104  0.067  0.039  0.021  0.012  0.012  0.021  0.039  0.067  0.104  0.152  0.209
0.196  0.138  0.091  0.054  0.026  0.008  0.001  0.001  0.008  0.026  0.054  0.091  0.138  0.196
─────────────────────── Plane of Symmetry ───────────────────────
0.196  0.138  0.091  0.054  0.026  0.008  0.001  0.001  0.008  0.026  0.054  0.091  0.138  0.196
0.209  0.152  0.104  0.067  0.039  0.021  0.012  0.012  0.021  0.039  0.067  0.104  0.152  0.209
0.237  0.179  0.131  0.094  0.066  0.047  0.038  0.038  0.047  0.066  0.094  0.131  0.179  0.237
0.279  0.220  0.172  0.134  0.105  0.087  0.077  0.077  0.087  0.105  0.134  0.172  0.220  0.279
0.336  0.276  0.227  0.188  0.159  0.140  0.131  0.131  0.140  0.159  0.188  0.227  0.276  0.336
0.409  0.348  0.298  0.258  0.229  0.209  0.200  0.200  0.209  0.229  0.258  0.298  0.348  0.409
0.500  0.437  0.386  0.345  0.315  0.295  0.285  0.285  0.295  0.315  0.345  0.386  0.437  0.500
```

| | | | | | | | | | | | | | |
|---|---|---|---|---|---|---|---|---|---|---|---|---|---|
| 0.413 | 0.352 | 0.302 | 0.261 | 0.231 | 0.210 | 0.200 | 0.201 | 0.212 | 0.233 | 0.266 | 0.309 | 0.364 | 0.430 |
| 0.348 | 0.289 | 0.240 | 0.201 | 0.171 | 0.151 | 0.142 | 0.142 | 0.152 | 0.173 | 0.203 | 0.244 | 0.297 | 0.360 |
| 0.297 | 0.237 | 0.189 | 0.151 | 0.122 | 0.103 | 0.094 | 0.094 | 0.104 | 0.123 | 0.153 | 0.192 | 0.243 | 0.305 |
| 0.257 | 0.198 | 0.149 | 0.112 | 0.084 | 0.065 | 0.056 | 0.056 | 0.065 | 0.084 | 0.113 | 0.151 | 0.201 | 0.263 |
| 0.228 | 0.169 | 0.120 | 0.083 | 0.055 | 0.037 | 0.027 | 0.027 | 0.037 | 0.055 | 0.083 | 0.122 | 0.171 | 0.233 |
| 0.209 | 0.150 | 0.102 | 0.064 | 0.036 | 0.018 | 0.009 | 0.009 | 0.018 | 0.036 | 0.064 | 0.103 | 0.152 | 0.213 |
| 0.199 | 0.140 | 0.092 | 0.055 | 0.027 | 0.008 | -0.001 | 0.001 | 0.008 | 0.027 | 0.055 | 0.093 | 0.142 | 0.203 |
| 0.198 | 0.139 | 0.092 | 0.054 | 0.027 | 0.008 | -0.001 | 0.001 | 0.008 | 0.027 | 0.054 | 0.092 | 0.141 | 0.201 |
| 0.206 | 0.148 | 0.101 | 0.064 | 0.036 | 0.018 | 0.009 | 0.009 | 0.018 | 0.036 | 0.064 | 0.101 | 0.150 | 0.209 |
| 0.226 | 0.168 | 0.121 | 0.083 | 0.055 | 0.036 | 0.027 | 0.027 | 0.036 | 0.055 | 0.083 | 0.121 | 0.170 | 0.229 |
| 0.258 | 0.199 | 0.151 | 0.112 | 0.083 | 0.064 | 0.056 | 0.056 | 0.064 | 0.083 | 0.113 | 0.152 | 0.201 | 0.261 |
| 0.302 | 0.241 | 0.190 | 0.150 | 0.121 | 0.102 | 0.094 | 0.094 | 0.102 | 0.121 | 0.151 | 0.191 | 0.243 | 0.305 |
| 0.356 | 0.292 | 0.239 | 0.198 | 0.168 | 0.150 | 0.142 | 0.142 | 0.150 | 0.168 | 0.198 | 0.240 | 0.294 | 0.360 |
| 0.421 | 0.351 | 0.296 | 0.255 | 0.226 | 0.208 | 0.201 | 0.201 | 0.208 | 0.226 | 0.255 | 0.298 | 0.354 | 0.425 |

Fig. 1

| | | | | | | | | | | | | | |
|---|---|---|---|---|---|---|---|---|---|---|---|---|---|
| 0.500 | 0.437 | 0.386 | 0.345 | 0.315 | 0.295 | 0.285 | 0.285 | 0.295 | 0.315 | 0.345 | 0.386 | 0.437 | 0.500 |
| 0.409 | 0.348 | 0.298 | 0.258 | 0.229 | 0.209 | 0.200 | 0.200 | 0.209 | 0.229 | 0.258 | 0.298 | 0.348 | 0.409 |
| 0.336 | 0.276 | 0.227 | 0.188 | 0.159 | 0.140 | 0.131 | 0.131 | 0.140 | 0.159 | 0.188 | 0.227 | 0.276 | 0.336 |
| 0.279 | 0.220 | 0.172 | 0.134 | 0.105 | 0.087 | 0.077 | 0.077 | 0.087 | 0.105 | 0.134 | 0.172 | 0.220 | 0.279 |
| 0.237 | 0.179 | 0.131 | 0.094 | 0.066 | 0.047 | 0.038 | 0.038 | 0.047 | 0.066 | 0.094 | 0.131 | 0.179 | 0.237 |
| 0.209 | 0.152 | 0.104 | 0.067 | 0.039 | 0.021 | 0.012 | 0.012 | 0.021 | 0.039 | 0.067 | 0.104 | 0.152 | 0.209 |
| 0.196 | 0.138 | 0.091 | 0.054 | 0.026 | 0.008 | 0.001 | 0.001 | 0.008 | 0.026 | 0.054 | 0.091 | 0.138 | 0.196 |
| — Plane of Symmetry — | | | | | | | | | | | | | |
| 0.196 | 0.138 | 0.091 | 0.054 | 0.026 | 0.008 | 0.001 | 0.001 | 0.008 | 0.026 | 0.054 | 0.091 | 0.138 | 0.196 |
| 0.209 | 0.152 | 0.104 | 0.067 | 0.039 | 0.021 | 0.012 | 0.012 | 0.021 | 0.039 | 0.067 | 0.104 | 0.152 | 0.209 |
| 0.237 | 0.179 | 0.131 | 0.094 | 0.066 | 0.047 | 0.038 | 0.038 | 0.047 | 0.066 | 0.094 | 0.131 | 0.179 | 0.237 |
| 0.279 | 0.220 | 0.172 | 0.134 | 0.105 | 0.087 | 0.077 | 0.077 | 0.087 | 0.105 | 0.134 | 0.172 | 0.220 | 0.279 |
| 0.336 | 0.276 | 0.227 | 0.188 | 0.159 | 0.140 | 0.131 | 0.131 | 0.140 | 0.159 | 0.188 | 0.227 | 0.276 | 0.336 |
| 0.409 | 0.348 | 0.298 | 0.258 | 0.229 | 0.209 | 0.200 | 0.200 | 0.209 | 0.229 | 0.258 | 0.298 | 0.348 | 0.409 |
| 0.500 | 0.437 | 0.386 | 0.345 | 0.315 | 0.295 | 0.285 | 0.285 | 0.295 | 0.315 | 0.345 | 0.386 | 0.437 | 0.500 |

Fig. 2

B-SPLINE OPTIMIZATION OF OPTICAL GLASSES ESPECIALLY SPECTACLE GLASSES WITH PLANES OF SYMMETRY

TECHNICAL FIELD

The invention relates to a method for optimizing a surface, particularly an atoroidal surface of an optical lens, particularly a spectacle lens, having at least one plane of symmetry.

Within the scope of the present application an "atoroidal surface" (in a general sense) is understood to be a surface having two different principal meridians, the shape of at least one of which differs from being circular. The curvatures of the two principal meridians at the apex of the spectacle lens may be equal, so that the atoroidal deviations of the principal meridians from a circular shape serve merely for correction of imaging errors. Of course, it is also possible for the curvatures of the two principal meridians at the apex of a spectacle lens to differ in such manner that the resulting astigmatism serves to correct corresponding astigmatism of an eye.

PRIOR ART

Because of the great progress (and also a reduction of costs) which has been achieved by means of numerically controlled machines for fabricating aspherical (or atoroidal) surfaces, and by means of computers for optimizing aspherical surfaces, particularly for a so-called position of use, it was already suggested some time ago that individually optimized spectacle lenses, i.e. specially computed for a particular spectacles wearer, be fabricated.

Attention is drawn to DE 42 10 008 A1 only as an example. In this publication it is suggested that as an alternative to a multifocal lens computed for an individual wearing position, a multifocal surface conceived for an average wearing position be used on the front side, and a generally aspherical or atoroidal surface without point or axial symmetry be used on the eye-side surface. For this, the eye-side surface is specially computed so that it takes account of individual conditions of use. The geometry of the eye-side surface can be determined so that it exhibits not only the dioptric power stipulated by a particular spectacles prescription, but also corrects image defects resulting from the use of a progressive surface that has been computed for a definite wearing position, in a different wearing position—with different interpupillary distance, different pantoscopic angle, different vertex distance etc.

However, the use of a generally aspherical surface without point or axial symmetry as a prescription surface substantially increases the cost of a progressive spectacle lens in which, of course, the other surface is a generally spherical surface.

It has therefore been suggested that an atoroidal surface having at least one plane of symmetry be used as a prescription surface which corrects image defects arising when a multifocal surface intended for a particular average wearing situation is used in a different wearing position.

Concerning this, attention is drawn by way of example to the spectacle lenses manufactured and marketed by the present Patent Applicant, namely the firm of Optische Werke G. Rodenstock, under the designation "Multigressiv (II)", in which an individual eye-side atoroidal surface is used which not only provides an astigmatic power that may be required by a particular prescription, but also corrects the image defects caused by an individual wearing situation. Furthermore, attention is drawn to DE 195 11 613 A1 and also to the literature mentioned therein, to which, furthermore, reference is expressly made concerning an explanation of all details not described here more closely.

For a computation of atoroidal surfaces various methods have been proposed with which atoroidal surfaces can be represented and optimized. To be mentioned as examples are atoroidal surfaces having a horizontal generatrix, atoroidal surfaces having a meridional generatrix with two, one, and no planes of symmetry, or completely unsymmetrical atoroidal surfaces which are described by means of splines. Concerning this, attention is drawn to U.S. Pat. No. 6,012,813, to which furthermore attention is expressly drawn concerning an explanation of all terms not described here in detail.

Symmetries are always restrictive when the object of the optimization to be achieved is actually of a unsymmetrical nature, However, in certain cases—as already mentioned—for example for reasons of fabrication, it may be of advantage to compute and fabricate a symmetrical surface instead of an unsymmetrical surface.

Thus, for the optimization of the Multigressiv II spectacle lens an atorus having one plane of symmetry, which is not represented by splines, is used, and not an unsymmetrical atorus which can be represented and optimized with B spline functions.

On the other hand, the use of a B spline would be more advantageous than that of the functions used in conventional optimization, because contrary to the conventional representation of an atorus, particularly a symmetrical atorus, the local properties (restricted carrier) of a B spline can be used in order to reduce the running time of the optimization because of the structure of the weakly occupied matrices. With B splines a piecewise interpolation of low order is actually performed, i.e. the interpolation is always made along a few supporting points of an interval, and the interpolation polynomials are put together, at least the first and the second derivative being always continuous at the seam positions. It is also possible to use interpolation formulae with their derivatives.

In a general case, however, a B spline does not yield the symmetrical surface—which may sometimes be desired for the reasons mentioned—so that in prior art the use of B splines for representing and optimizing surfaces having one or a plurality of planes of symmetry has not been considered.

DESCRIPTION OF THE INVENTION

The invention is therefore based in the object of providing a method for optimizing an atoroidal surface, in particular a prescription surface of a spectacle lens, in which a surface which is atoroidal in the general sense and is represented by B splines is optimized in such manner that stipulated symmetry conditions are maintained even after the optimization.

An achievement of this object in accordance with the invention is set out in patent claim 1. Further developments of the method of the invention are the subject matter of claim 2 and the claims following.

The basic concepts of the invention make it possible for a B spline to be rendered symmetrical, so that even after an optimization it will describe a surface having one, two or more planes of symmetry. For this and in an advantageous manner, only a section of the atoroidal surface, determined by the respective planes of symmetry, need be optimized by means of B spline interpolation and the associated optimization method.

Thus, according to the invention a method is provided for optimizing an (in the general sense) atoroidal surface of an optical lens, particularly a spectacle lens, the surface having at least one plane of symmetry, the method being characterized by a combination of the following features;

dividing the atoroidal surface having at least one plane of symmetry into at least two regions separated by the at least one plane of symmetry;

representing one of the separate regions (represented region) of this surface by a set of coefficients of B spline functions;

computing sagittal heights of the represented region by B spline interpolation;

computing sagittal heights in at least one other region by mirroring coefficients or coordinates at the at least one plane of symmetry; and optimizing the atoroidal surface only by varying the set of B spline coefficients of the represented region.

The surface represented and optimized in accordance with the invention is, in a general sense, an atoroidal surface as defined above. This surface which in this sense is generally atoroidal may, but need not, have a surface astigmatism suitable for compensating astigmatism of an astigmatic eye. The astigmatism resulting from the different shape of the two principal meridians may also serve only to compensate an undesired astigmatism of the spectacle lens for an otherwise astigmatism-free eye.

Even when using B splines which, as set out above, lead to not only a physiologically advantageous but also a simple and thus easily computable surface, it is possible with the method according to the invention to obtain surfaces which satisfy the given requirements of symmetry, and therewith have advantages over completely unsymmetrical surfaces, for example with respect to fabrication.

With this it is possible to compute surfaces, as stipulated, having one, two or even more planes of symmetry.

In case only one plane of symmetry is used, it is preferred that the two regions into which the surface is divided be hemispheres. Put in a different way, the plane of symmetry passes through the geometrical center of an unfinished round spectacle lens blank. Of course, it is also possible to compute spectacle lenses having planes of symmetry which do not pass through the apex or the center of the spectacle lens.

However, certain prescription values may also be optimally satisfied by spectacle lenses having an atoroidal surface with two planes of symmetry. Here it becomes particularly evident that with an increase of the number of planes of symmetry the effort of computation can be considerably reduced.

In the case of a computation of a surface having two planes of symmetry, it is of further advantage for this surface to be divided into four regions which are separated by the two planes of symmetry. One of the four regions (represented region) is then represented by a set of coefficients of B spline functions. The sagittal heights of the represented region are computed by B spline interpolation. The sagittal heights of the other three regions are computed by mirroring the coefficients or the coordinates at each of the first and the second planes of symmetry, and also at both planes of symmetry taken together. Even in the case of a surface with two planes of symmetry, the atoroidal surface is optimized only by varying the set of B spline coefficients of the represented region.

In case two sets of symmetry are used, it is furthermore of advantage for the four regions into which the surface is divided to be quadrants.

Irrespective of the number of planes of symmetry, it is in any case preferred for the used B spline to be two-dimensional. With two-dimensional spline functions the coefficient matrix to be optimized in the case of one plane of symmetry has $n_z/2$ lines and $n_s/2$ columns, and in the case of two planes of symmetry has $n_z/4$ lines and $n_s/4$ columns, wherein $n_z$ and $n_s$ are the number of the lines and columns, respectively, which are (would be) needed in a representation of the entire surface with B splines.

For optimizing the surface, the set of B spline coefficients of the represented region is suitably varied by cyclic iteration until selected image defects—which may have been selected according to a firm's philosophy—are reduced to below a limit set for each image defect. Alternatively or additionally, performance functions may also be used which are formed from a plurality of image defects. The surface is then optimized until the (respective) performance function is reduced to below an (individually) set limit.

A preferred possibility of optimizing the atoroidal surface consists of computing the image defects or the performance functions merely for a plurality of points (assessment points which represent the surface and at which the iteration problem arises. In particular, the assessment points may—but need not—form an equidistant grid.

The effort of computation with the method according to the invention is further reduced by starting out from a "pre-optimized" surface when computing the atoroidal surface of the invention. For this, the optimized surface is computed as a B spline surface starting out from a first assumed B spline coefficient matrix (starting coefficient matrix). With this manner of proceeding, it is preferred to determine the image defects at the assessment points of the B spline surface by subtracting the actual values of the imaging properties from the desired values at the assessment points. Furthermore, with this manner of proceeding it is of advantage to determine the value of the performance function describing an optical property of the lens by weighting and summing selected or all image defects at the assessment points.

Furthermore, it is possible to determine a vector of a variable governing the direction of decrease of the performance function using the value of the performance function and suitable algorithms. Such suitable algorithms may be, for example, the Gauss-Newton method, a quasi Newton method, or similar methods.

For this, in particular, it is possible to proceed so that the computed vector of a variable is suitably copied into the B spline coefficient matrix, so that in this manner a further B spline coefficient matrix is available as a basis for a further optimization cycle. The optimization by varying the set of B spline coefficients is performed by iteration until the performance function has been sufficiently minimized.

Irrespective of the detailed manner of proceeding, cubic splines or splines of $4^{th}$ order may be used as B splines.

Furthermore, it is preferred for the assessment points to be positioned in the vicinity of the at least one plane of symmetry.

If the atoroidal surface is to serve also for correcting an eye-astigmatism having a cylinder axis which is different from a horizontal or vertical axis, it is preferred for the at least one plane of symmetry to be perpendicular to the cylinder axis or parallel thereto. This applies in a correspond manner to inclined prisms.

BRIEF DESCRIPTION OF THE DRAWINGS

In the following the invention is described by way of example, without limitation of the general inventive concept, with the aid of an embodiment with reference to the drawings to which attention is expressly drawn concerning the disclosure of all details of the invention not described more explicitly in the text. Shown by FIG. 1 is an example of a set of B spline coefficients describing an unsymmetrical surface;

FIG. 2 is an example of a set of B spline coefficients describing a surface, the surface being determined by only one plane of symmetry.

DESCRIPTION OF EXAMPLES OF EMBODIMENT

In the following it will be assumed that the surface to be optimized is described by a two-dimensional B spline, the coefficient matrix of which has $n_z$ lines and $n_s$ columns. The points at which the interpolation problem is given are present in the form of an equidistant grid. Two-dimensional B splines are described, for example, in the book by Carl de Boor "A Practical Guide to Splines", Applied Mathematical Sciences 27, published by Springer-Verlag 1987.

In the optimization, the B spline coefficients representing the surface are varied for the purpose of minimizing a performance function. This performance function (merit function) describes the optical quality of the spectacle lens, for example by weighting and summing certain image defects arising at so-called assessment positions. An example of a performance function of this kind is the function F $$F(\vec{c}) = \sum_{i=1}^{M} \left[ g_{i,R}(R_{i,real}(\vec{c}) - R_{i,ideal})^2 + g_{i,A}(A_{i,real}(\vec{c}) - A_{i,ideal})^2 \right]$$

$\vec{c}$ vector of the spline coefficients for the atoroidal surface,

M number of assessment positions, $R_{i,real}$, $A_{i,real}$ real refraction defect and astigmatism at the $i^{th}$ assessment position, $R_{i,ideal}$, $A_{i,ideal}$ ideal refraction defect and astigmatism at the $i^{th}$ assessment position, $g_{i,R}$, $g_{i,A}$ weighted coefficient of the refraction defect or the astigmatism at the $i^{th}$ assessment position.

Of course, it is also possible to incorporate other parameters such as, for example, the cylinder axis of the astigmatism in the performance function.

When during the running of the program the performance function is called up by the optimization routine, the following occurs:

The variables vector proposed by the optimization routine is suitably copied into the B spline coefficient matrix, so that the actual B spline surface is obtained. The imaging properties are then computed for this surface, and finally the performance function is determined by subtracting the actual values of the imaging properties from the desired values or the ideal stipulated values. The value of this performance function and possibly also the Jakobi Matrix is returned to the optimization routine which determines the direction of decrease on the basis of the algorithms used (Gauss-Newton, quasi Newton, or others).

Even when the starting surface is symmetrical before the optimization, it will generally no longer exhibit any symmetry after the first optimization step.

In accordance with the invention it is possible to proceed as follows in order to achieve such symmetry.

Only one hemisphere of the symmetrical surface (bounded by the plane of symmetry) is represented by the set of B spline coefficients. The coefficient matrix therefore does not have $n_z$ lines and $n_s$ columns, but only $n_s/2$ columns and $n_z$ lines, or $n_s$ columns and $n_z/2$ lines.

The other half of the surface is obtained by mirroring the coefficients or the coordinate at the plane of symmetry when the routine is called up. Because of this, the B spline surface is always symmetrical to this plane. With cubic B splines it is then ensured that the surface an be continuously partially differentiated twice even at the plane of symmetry. In a corresponding manner, B splines of the $4^{th}$ order can be continuously partially differentiated three times.

The following advantages result from proceeding in accordance with the invention:

The representation of the surface by about only one half of the coefficients reduces the number of variables in the optimization problem. Thereby the running time is reduced.

Because of the locality of the B splines, the imaging properties must not be computed anew at all assessment positions when a coefficient is changed, but only those in close vicinity. This, above all, saves elaborate and therefore costly iteration of principal rays.

The local property of the B splines permits the application of algorithms which utilize the weak occupation of the matrices.

The surfaces are no longer restricted by the applied mathematical approach (e.g. meridional generatrices), but are—except for the plane of symmetry—typical of splines as far as their performance is concerned: they are "freely formed surfaces".

The plane of symmetry at which the coefficients or coordinates are mirrored during the evaluation of the sagittal height need not extend vertically or horizontally in space. With oblique cylinders or inclined prisms it will be expedient to choose it more skillfully, e.g. to be perpendicular to the cylinder axis or parallel thereto.

The above-mentioned choice of an equidistant grid implies no restriction, because a transformation from a non-equidistant grid of the spectacle lens to an equidistant B spline grid may be made at any time. Merely the plane of symmetry to be achieved must be maintained in this transformation.

FIG. 1 shows the set of B spline coefficients for an unsymmetrical, generally aspherical or atoroidal eye-side surface, providing an example of an unsymmetrical surface.

FIG. 2 shows an example of a set of B spline coefficients describing a surface having one plane of symmetry.

The invention has been described above with the aid of an example of embodiment without limitation of th general inventive concept.

What is claimed is:

1. Method for optimizing an atorodial surface of a spectacle lens, having at least one plane of symmetry comprising:

dividing said atorodial surface having at least one plane of symmetry into at least two regions separated by said at least one plane of symmetry;

representing one of the separate regions of this surface by a set of coefficients of B spline functions;

computing sagittal heights of the represented region by B spline interpolation;

computing sagittal heights in at least one other region by mirroring coefficients or coordinates at said at least one plane of symmetry; and optimizing the atorodial surface only by varying the set of B spline coefficients of the represented region.

2. Method according to claim 1, characterized in that the two regions into which the surface is divided are hemispheres.

3. Method according to claim 1, characterized in that an atorodial surface having two planes of symmetry is computed by dividing this surface into four regions separated by the two planes of symmetry;

representing one of the four regions by a set of coefficients of B spline functions;

computing sagittal heights of the represented region by B spline interpolation;

computing sagittal heights in the other three regions by mirroring coefficients or coordinates at each of the first and second plane of symmetry and also at both planes of symmetry together; and optimizing the atorodial surface only by varying the set of B spine coefficients of the represented region.

4. Method according to claim 3, characterized in that the four regions into which the surface is divided are quadrants.

5. Method according to any one of claims 1 to 4, characterized in that the B spline used is two-dimensional.

6. Method according to claim 5, characterized in that the coefficient matrix to be optimized in the case of a plane of symmetry has a $n_z/2$ lines and $n_s/2$ columns, and in the case of two planes of symmetry has $n_z/2$ lines and $n_s/2$ columns, wherein $n_z$ and $n_s$ are the number of the lines and columns, respectively, which are needed in representing the entire surface with B splines.

7. Method according to any one of claims 1 to 4, characterized in that the surface is optimized by varying iteratively in cycles the set of B spline coefficients of the represented region until selected image defects are reduced to below a given limit for each image defect, or performance functions formed from a plurality of image defects are reduced to below a given limit.

8. Method according to claim 7 characterized in that the coefficient matrix to be optimized in the case of a plane of symmetry has a $n_z/2$ lines and $n_s/2$ columns, and in the case of two planes of symmetry has $n_z/2$ lines and $n_s/2$ columns, wherein $n_z$ and $n_s$ are the number of the lines and columns, respectively, which are needed in representing the entire surface with B splines, and the image defects or the performance functions are computed merely for a plurality of assessment points representing the surface, at which the iteration problem is given.

9. Method according to claim 8, characterized in that the assessment points form an equidistant grid.

10. Method according to any one of claims 1 to 4, characterized in that the optimized surface is computed as a B spline surface starting out from a first assumed B spline coefficient matrix.

11. Method according to claim 10, characterized in that the surface is optimized by varying iteratively in cycles the set of B spline coefficients of the represented region until selected image defects are reduced to below a given limit for each image defect, or performance functions formed from a plurality of image defects are reduced to below a given limit, the coefficient matrix to be optimized in the case of a plane of symmetry has a $n_z/2$ lines and $n_s/2$ columns, and in the case of two planes of symmetry has $n_z/2$ lines and $n_s/2$ columns, wherein $n_z$ and $n_s$ are the number of the lines and columns, respectively, which are needed in representing the entire surface with B splines, and the image defects or the performance functions are computed merely for a plurality of assessment points representing the surface, at which the iteration problem is given the image defects at the assessment points of the B spline surface are determined by subtraction of the actual values of the imaging properties from the desired values at the assessment points.

12. Method according to claim 11, characterized in that the value of performance function describing an optical property of the lens is determined by weighting and summing selected or all image defects at the assessment points.

13. Method according to claim 12, characterized in that a variables vector determining a direction of decrease of the B spline surface is determined using the value of the performance function and suitable algorithms.

14. Method according to claim 13, characterized in that a variables vector determining the direction of decrease of the B spline surface is determined using the value of the performance function, a Jakobi Matrix and suitable algorithms.

15. Method according to claim 13, characterized in that a Gauss-Newton Method, a quasi-Newton method or similar methods are used as suitable algorithms.

16. Method according to claim 15, characterized by copying the computed variables vector into the B spline coefficient matrix, so that in this manner a further B spline coefficient matrix is available as a basis for a further optimization cycle.

17. Method according to claim 16, characterized in that the optimization is performed by iteratively varying the set of B spline coefficients until the performance function has been sufficiently minimized.

18. Method according to any one of claims 1 to 4, characterized in that the B spline are cubic splines or splines of $4^{th}$ order.

19. Method according to claim 8, characterized in that at least some assessment positions are positioned close to the at least one plane of symmetry.

20. Method according to any one of claims 1 to 4, characterized in that with oblique cylinder axes or inclined prisms the at least one plane of symmetry is perpendicular to the cylinder axis or parallel thereto.

* * * * *